(No Model.)
P. J. JACOBSON.
MACHINE FOR GATHERING POTATO BUGS.
No. 309,955. Patented Dec. 30, 1884.
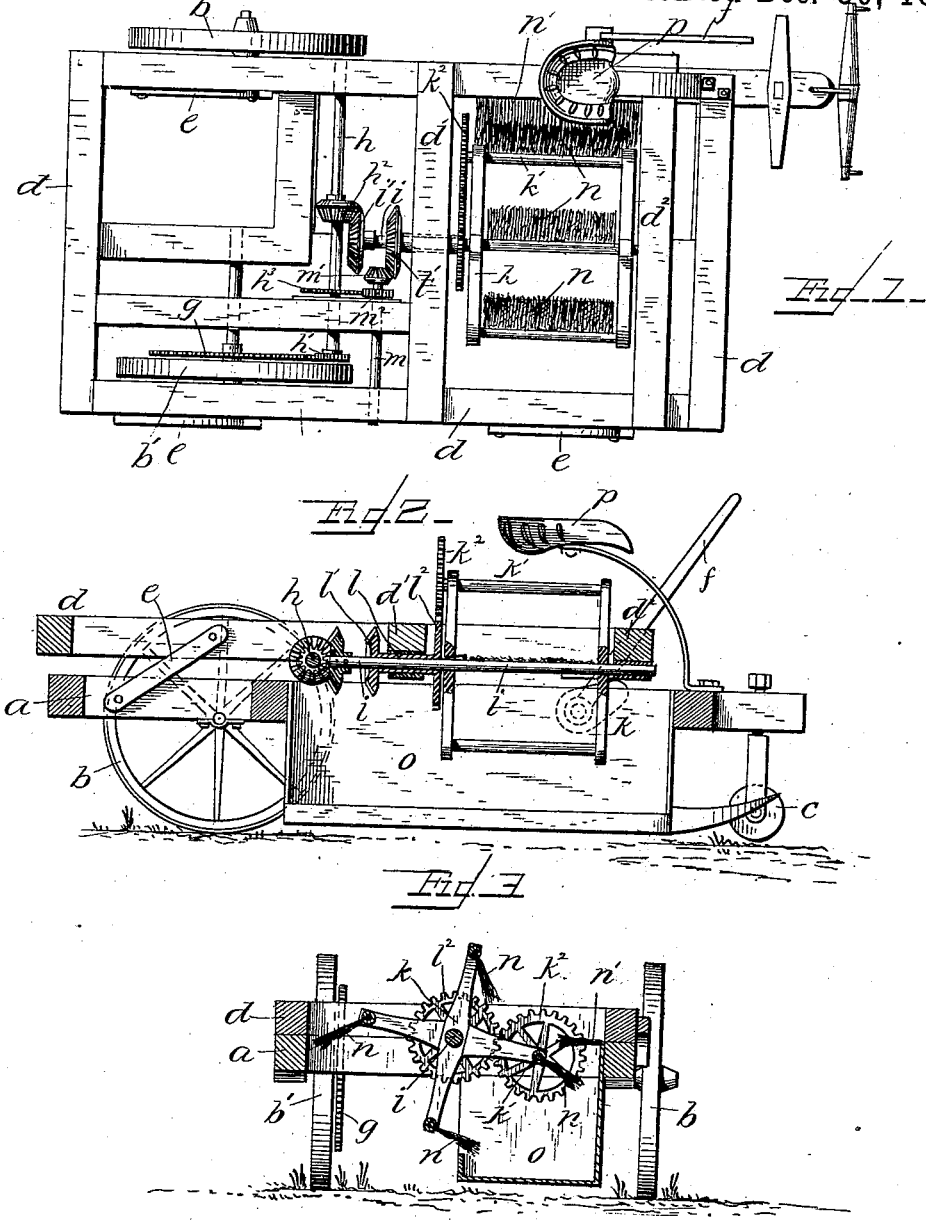
WITNESSES
INVENTOR
Pehr Johan Jacobson,
By Simonds & Burdett,
Attorneys

United States Patent Office.

PEHR JOHAN JACOBSON, OF SOUTH MANCHESTER, CONNECTICUT.

MACHINE FOR GATHERING POTATO-BUGS.

SPECIFICATION forming part of Letters Patent No. 309,955, dated December 30, 1884.

Application filed May 14, 1884. (No model.)

*To all whom it may concern:*

Be it known that I, PEHR JOHAN JACOBSON, of South Manchester, in the county of Hartford and State of Connecticut, have invented certain new and useful Improvements in Machines for Gathering Potato-Bugs; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1 is a top view of my machine. Fig. 2 is a view in longitudinal vertical section of the machine, looking toward the pan, and on a plane passing through the axis of the revolving brush-frame. Fig. 3 is a view in vertical cross-section of the device, looking toward the rear, on a plane passing through the revolving brush-frame near the center of its length.

The object of my invention is to furnish an improved machine for removing potato-bugs from vines standing in the field, and to make one that shall be readily adjustable to the various heights of vines, the bugs being brushed into a box as the machine is drawn across the field, from which box the bugs may be removed and destroyed.

It consists in the combination of devices for operating the brushes, for cleaning the brushes, and for adjusting them to various heights, as more particularly hereinafter described.

In the accompanying drawings, the letter $a$ denotes a frame of any suitable material—as wood—mounted upon wheels $b\ b'$, near the rear part of the frame, and having a smaller wheel, $c$, near the front part, which, arranged like a colter, serves as a guide; $d$, an upper frame pivotally connected to the lower frame by bars $e$, forming a parallel-motion device that allows the upper frame to be raised or lowered at will, as by means of a lever, $f$, pivoted to the lower frame, and having a cam-arm located between the upper and lower frame in such manner that the rotation of the cam by means of the lever lifts or lowers the upper frame. A cog-wheel, $g$, is secured to the hub of one of the wheels $b$, and turns with the wheel. Journaled in bearings in the upper frame, $d$, is the transverse shaft $h$, bearing a cog-wheel, $h'$, in mesh with the driving cog-wheel $g$, and a beveled gear in mesh with a beveled gear, $i'$, fast to a shaft, $i$, arranged longitudinally and about centrally of the frame, in bearings in the cross-bars $d'\ d^2$ of the frame $d$. Fast to this shaft $i$ is a revolving brush-frame, $k$, that turns with the shaft $i$ and is driven by the turning of the wheel $b$ as the machine is drawn along the ground. The shaft $i$ passes through the sleeve $l$, that is rotarily arranged in a bearing in the cross-bar $d'$, and the beveled cog $l'$, fast to the rear end of this sleeve, is in mesh with a beveled cog, $m'$, secured on the rotary shaft $m$, that is driven by the cog-wheel $h^3$, fast to the shaft $h$, and in mesh with a cog-wheel, $m^2$, fast to shaft $m$. Cog-wheel $l^2$ is secured to the forward end of the sleeve $l$, and is in mesh with and turns the cog-wheel $k^2$, fast to one end of the rotary brush-holder $k'$. The outer ends of each pair of arms of the brush-frame bear one of these rotary brush-holders, to which is fastened a cog-wheel, also in mesh with the cog $l^2$. (All but one of the wheels on the brush-holders have been omitted from the drawings to avoid confusion.) The rotary holders are slitted lengthwise, and the brushes $n$ are clamped in the slit in the holder, as by means of screws. The rotation of the wheel $b'$ by means of the connected mechanism described causes the brush-frame to turn upon its axis and the holders to rotate in their bearings in the frame in such manner that the brushes in succession sweep the bugs from the vines into the box $o$. The rotation of the brushes prevents the bugs from being thrown off by the repeated turning of the frame, and also enables the fixed brush $n'$, that projects inward from the upper edge of the box, to clear the brushes on the frame. The box $o$ is fastened to the frame and is open upon the side toward the brush-frame, as shown. The seat $p$ is attached to the frame by bolts in the ordinary manner.

I claim as my invention—

1. In combination, a wheeled frame, $a$, bearing the receiving-pan $o$, and a revolving brush-frame, $k$, which bears a series of rotary brushes, $n$, driven by gears $k^2$ in mesh with a central gear, $l^2$, driven by the rotation of the main wheel of the vehicle by means of intermediate mechanism, all substantially as described.

2. In combination, a wheel-supported frame, a, bearing a box, o, a brush, n', fixed to the frame and projecting over the box, and a revolving brush-frame, k, bearing the rotary brushes n, fixed in the brush-holders k', all substantially as described, and for the purpose set forth.

3. In a potato-bug gatherer, the combination of a main frame bearing a pan or box, a vertically-adjustable frame bearing a series of rotary and revolving brushes, and a brush fixed to the lower frame, whereby the moving brushes are cleaned, all substantially as described, and for the purpose set forth.

PEHR JOHAN JACOBSON.

Witnesses:
H. R. WILLIAMS,
W. H. MARSH.